No. 645,176. Patented Mar. 13, 1900.
N. MARSH.
SUPPLEMENTAL VEHICLE SEAT.
(Application filed Dec. 18, 1899.)
(No Model.)
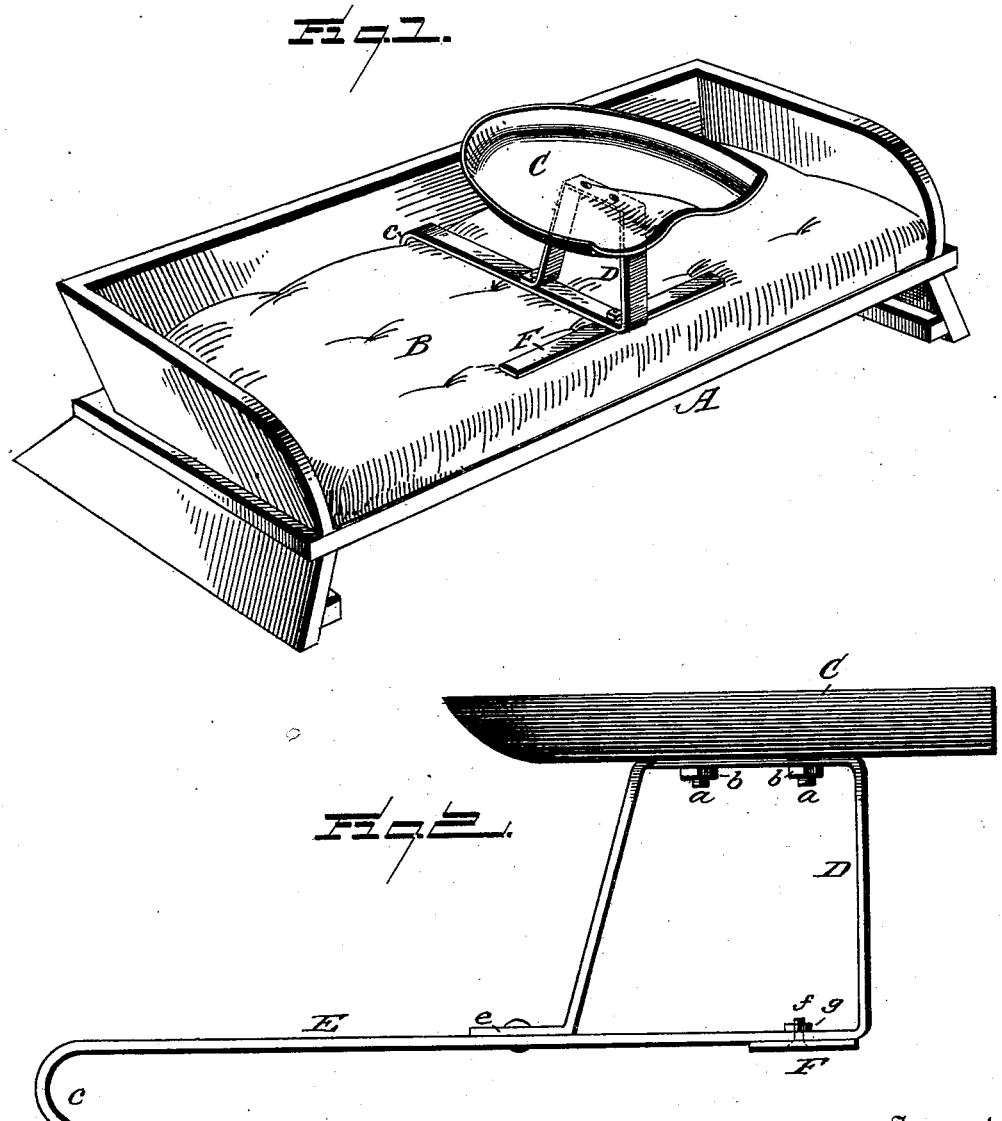
Witnesses:
L. C. Hills.
W. R. Taylor
Inventor:
Nelson Marsh,
Chas. H. Fowler.
By
Attorney

UNITED STATES PATENT OFFICE.

NELSON MARSH, OF BERNARDSTON, MASSACHUSETTS.

SUPPLEMENTAL VEHICLE-SEAT.

SPECIFICATION forming part of Letters Patent No. 645,176, dated March 13, 1900.

Application filed December 18, 1899. Serial No. 740,757. (No model.)

*To all whom it may concern:*

Be it known that I, NELSON MARSH, a citizen of the United States, residing at Bernardston, in the county of Franklin and State of Massachusetts, have invented certain new and useful Improvements in Supplemental Vehicle-Seats; and I do hereby declare that the following is a full, clear, and exact description of the same, reference being had to the annexed drawings, making a part of this specification, and to the letters of reference marked thereon.

The present invention has for its object to provide a third seat for a vehicle that may be readily attached to the cushion of the permanent seat and detached from the cushion when not required for use; and it consists in a supplemental seat constructed substantially as shown in the drawings and hereinafter described and claimed.

Figure 1 of the drawings is a perspective view showing the ordinary seat of a vehicle with my improved supplemental seat connected thereto. Fig. 2 is a side elevation, on an enlarged scale, of the supplemental seat.

In the accompanying drawings, A represents the usual seat of a vehicle, with the cushion B, and C the supplemental seat, resting thereon and above the plane of said cushion. This supplemental seat C may be of metal or any other suitable material and of any preferred shape and size and is detachably connected to a supporting skeleton frame D by means of bolts $a$ and nuts $b$ or by any other well-known means whereby said seat may be detached from the supporting-frame. This frame D is preferably constructed of strap metal, one end of which is bent to form a hooked horizontal part E, the hook $c$ being at the extremity thereof and terminating in a flat foot or bearing $d$. The opposite end of the horizontal part from which the supporting-frame is constructed is bent outwardly at a right angle to a perpendicular to form an upwardly-extending front part, a horizontal top part, a downwardly-inclined rear part, and a flat foot or flange $e$, by which said end may be riveted or otherwise secured to the shank. A cross-bar F is secured to the under side of the shank E by means of bolt $f$ and nut $g$ or by any other suitable fastening, as found most desirable. In connecting the supplemental seat C to the vehicle-seat A the shank E and cross-bar F rest upon the cushion B and the hook $c$ engages the back edge of the cushion, while the flat bearing $d$ will rest upon the bottom of the seat to form a better support for the frame of the supplemental seat.

When in position as shown in Fig. 1 of the drawings, the supplemental seat will be in position between the two persons occupying the vehicle-seat and will come on a plane just above the laps of the two persons, so that the seat will not be in the way, thereby accommodating a third person on a single-seat vehicle. The supplemental seat when not required for use can be readily and conveniently detached and removed from the vehicle.

Having now fully described my invention, what I claim as new, and desire to secure by Letters Patent, is—

A supplemental seat for a vehicle comprising a single detachable skeleton frame constructed with a horizontal part adapted to rest, and to be supported, on a cushion, having, at its inner end, a downwardly-extending hooked part adapted to receive the inner edge of the cushion, and a flat foot adapted to rest on the seat beneath the cushion, and, at its outer end, an upwardly-extending front part, a horizontal top part, and a downwardly-inclined rear part, having a flat foot secured to the lower horizontal part, the cross-bar secured beneath and to the outer end of the lower horizontal part, and adapted to rest, and to support the frame, on the front part of the cushion, and a seat proper secured to the horizontal top part of the frame.

In testimony that I claim the above I have hereunto subscribed my name in the presence of two witnesses.

NELSON MARSH.

Witnesses:
MYRON L. CORBETT,
DANA MALONE.